Patented Nov. 9, 1937

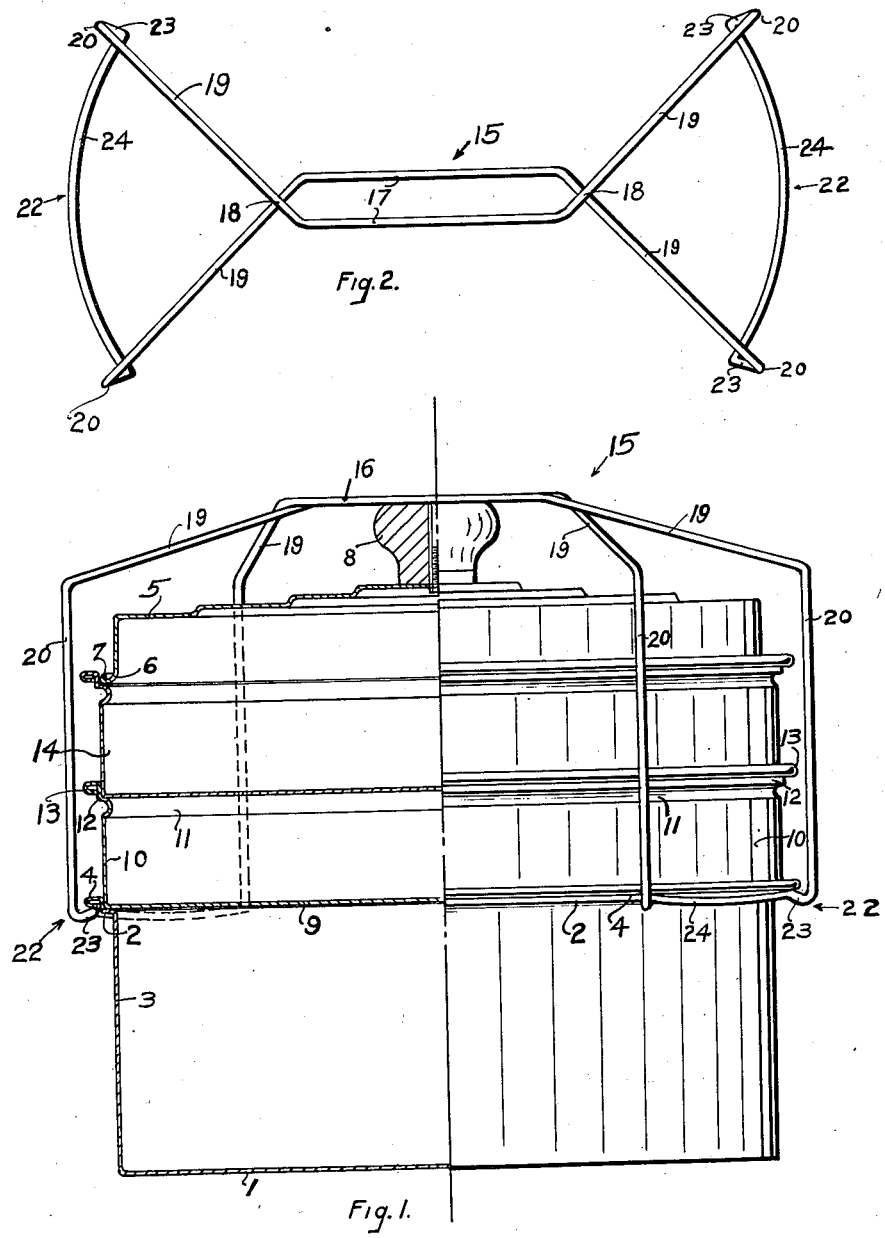

2,098,356

UNITED STATES PATENT OFFICE 2,098,356

COMBINATION FOOD CONTAINER

Frederick F. Pfefferkorn and Carl A. Stevens, Carrollton, Ohio, assignors to The Carrollton Metal Products Company, a corporation of Ohio Original application April 4, 1934, Serial No. 719,058. Divided and this application July 15, 1935, Serial No. 31,352

5 Claims. (Cl. 220—1)

This invention relates to improvements in food containers and this application is a division of our copending application, Serial Number 719,058, filed April 4, 1934.

It is an object of this invention to provide food containers useful for keeping and transporting a variety of edibles. It is an object of this invention to provide food containers composed of a plurality of separate parts affording several food compartments and equipped with means to secure the parts in assembled relation. It is an object of this invention to provide food containers having a plurality of separate parts adapted to be assembled together in different combinations to afford a variety of compartments and a means, detachable from the several parts, for holding the parts in assembled relation. It is an object of this invention to provide a plurality of nested containers adapted to be assembled and held together in nested relation by a one-piece wire clip.

Other objects and advantages of the present invention will appear in the following detailed description taken in connection with the accompanying drawings in which:

Figure 1 is a view in side elevation, partly broken away and in section, of one form of this invention.

Figure 2 is a top plan view of a wire clip such as shown in Figure 1.

Figure 3:
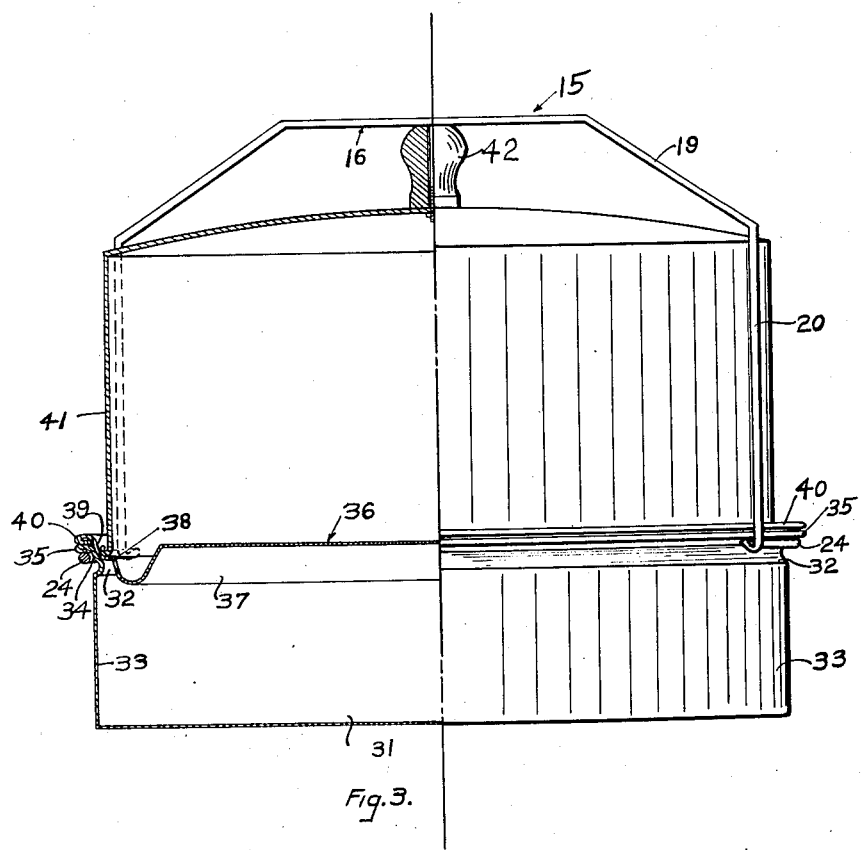
Figure 3 is a view in side elevation, partly broken away and in section, of another form of this invention.

It is desirable to have food containers of a size and shape best adapted for receiving certain articles, pie and cake for example, and to provide space for miscellaneous foods. It is expensive and impracticable to provide a large number of wholly separate containers, to meet every use.

According to this invention, several containers, each of which is separable from the others and useful separately, are combined, as parts of one container, to form a single combination container. The combination container affords a plurality of food compartments of various sizes adapted to receive various articles of food, or the like.

As shown in Figure 1, a receptacle such as deep pan 1 may serve as a base means for the whole container. At the top of the pan 1, the margin 2 is shaped to flare outwardly from the sides 3. A bead 4 may be formed on the margin 2 to give it rigidity. The outwardly flaring margin 2 affords a shoulder to receive covering means to close the pan 1. Obviously, other structures for receiving and supporting covering means may be provided in place of the outwardly flaring margin, if desired.

The covering means may take various forms. The covering means may consist of the lid 5 provided with an outwardly flaring side wall margin 6 terminating in a bead 7. A knob 8, or other suitable gripping means upstanding from the lid, may be secured in place by a screw, for example. The lid 5 is adapted to fit into the flaring margin 2 of the pan 1, to close it, if desired. The pan 1 and the lid 5 form a complete food container.

As shown in Figure 1, a receptacle or shallow pan 9 is arranged to fit within and rest on the flaring margin 2 of the receptacle 1. The outermost portion of the flaring margin 2 is upstanding to provide a wall to receive the bottom edge of the pan 9 and to hold it from lateral displacement. The shoulder afforded by the flaring margin 2 supports the pan 9. The pan 9 closes the receptacle 1 and serves as a covering means therefor.

The pan 9 also serves as a food container. The wall 10, of pan 9, is formed with an annular indentation 11 near the top of the wall. Above the indentation 11, the margin of the wall 10 is formed to provide an upstanding portion 12 and an outwardly flaring rim or flange 13. The top of the indentation 11 affords a shoulder, and the upstanding portion 12 affords a wall, to receive suitable covering means. Either the lid 5, or another receptacle 14, like receptacle 9, may be supported on the indentation 11, and within the upstanding portion 12 which prevents lateral displacement of the covering means. As shown in the drawings, the lid 5 is arranged on the pan 14, and the pan 14 on the pan 9.

Obviously, more pans could be included in the assembled container. Any of the pans shown may be dispensed with, leaving a complete container. The structure shown and described affords a variety of food compartments well adapted to various uses. The receptacle 1 may contain sandwiches, small cakes and cookies, and miscellaneous articles of food. The receptacles 9 and 14 are well adapted to receive pies. The extra space afforded by the cover 5 on the receptacle 14 affords space for receiving a cake. Receptacles 9 and 14 may be used with the cover 5, either separately or together. The receptacle 1, either receptacle 9 or 14, and the cover 5 may be combined to make a complete container.

The receptacle 1 and the cover 5 may be used together as a complete food container. The nesting arrangement of the various receptacles affords economy of space and the covering functions of the receptacles 9 and 14 affords economy of manufacture.

The described food container is a useful device without additional parts, especially about the home. However, it is often desirable to fasten the parts of the container together securely so that there will be no danger of accidentally opening any of the receptacles. This is especially so when the food is being carried or transported in the container. According to this invention, a clip is provided for holding the various parts of the container together securely.

As shown in the drawings, Figures 1 and 2, the clip 15 is of wire, bent to shape, and the ends joined together to form a one-piece wire clip. In order to hold the various receptacles of the container securely together, it is desirable to press down on the covering means, such as lid 5, and the upper receptacles in a direction substantially in line, or substantially parallel to, the vertical axis of the assembled containers. Such a force presses the parts tightly together, due to the manner in which they are nested together, without tending to dislodge them laterally. The clip 15 is constructed and arranged so as to act on the container.

As shown in Figure 1, the intermediate portion 16 of the clip engages with and presses down against the knob 8 on the cover. The intermediate portion 16 of the clip consists of the central wires 17, which engage the knob, and which cross as indicated at 18, where they are fastened together to hold the clip in a definite form; and of the wire portions 19, 20 and 21, which extend over and beyond the cover 5, and down along the sides of the container, as shown in Figure 1. The knob 8 extends slightly into the opening between wire portions 17, thereby preventing the intermediate portion of the clip from slipping off the knob.

The wire clip 15 is provided with inturned portions 22, consisting of wire portions 23, bent to project laterally from wire portions 21, and wire portions 24 bent into arcuate form and joining adjacent wire portions 23. The inturned portions 22 are adapted to engage the underside of the margin or flange 2 of the receptacle 1, with the intermediate portion extending over and across the covering means and engaging it to hold the parts together securely.

When the clip 22 is arranged in place, it is under spring tension with the intermediate portion pressing down on the covering means and the inturned portions pressing up on the underside of the margin of the base means. The clip is removed by springing it to free the inturned portions from the base means.

Obviously, the clips may be made in various sizes and used with various combinations of the pans 1, 9 and 14, together with the cover 5. When one of the pans 9 or 14 is used as a base means the inturned portions engage the underside of the outwardly flaring margin or flange 13.

Obviously, the clip 22 may be modified in many particulars. For example, it may be constructed to engage the top part of the covering means instead of a knob 8. Also, the inturned portions may be made without the connecting arcuate portion 24. Other modifications will be apparent to those skilled in the art.

Another form of the invention is illustrated in Figure 3. As shown there, the base means may be a receptacle 31 having an annular indentation 32 near the top of the wall 33, thereof. Above the indentation 32, the margin of the wall 33 has an upstanding portion 34 and an outwardly flaring portion or flange 35. A tray 36 has a central area 37 for receiving a cake or the like. The structure of this tray and its cover, are disclosed and claimed in the patent to Pfefferkorn, No. 1,762,417. At the margin, the tray 36 has a horizontal portion 38, surrounded by an upstanding portion 39 which terminates in its flange 40. The flange 40 rests on the flange 35 to support the tray 36, the upstanding portion 39 of the tray fitting within the upstanding portion 34 of the receptacle 31 to prevent lateral displacement of the tray.

A cover 41 rests on the portion 38 of the tray and fits within the upstanding portion 39, to prevent lateral displacement. The cover 41 and tray 36 and receptacle 31 provide another food compartment. The tray 36 may be left out and the cover 41 allowed to rest on the annular indentation 32 of the receptacle 31, to provide another food container. The receptacle 31 may be left off, and the tray 36 and cover 41 will form another food container. Still other combinations may be made by using other parts such as those illustrated in Figure 1, in combination with the parts of the device of Figure 3. The pans 1 or 9 may replace the receptacle 31, or be arranged beneath that receptacle. One of the pans 9 or 14 may be interposed between the receptacle 31 and the tray. The lid 5 of the device of Figure 1 may be replaced by the tray and cover of Figure 3. Thus a great variety of combination food containers may be made.

A clip 15 like that shown in Figure 2 may be arranged on the food container of Figure 3, the intermediate portion 16 engaging the knob 42 on cover 41 and the inturned portions 22 engaging the underside of the flange 35 to hold the cover, tray, and receptacle together. The same clip 15 will serve to hold the cover and receptacle together, leaving out the tray, or to hold the cover and the tray together, leaving off the receptacle. Obviously, clips may be provided for any of the various combinations above mentioned.

The wire portions 17 of the clip are spaced from the cover 5 or the cover 41 sufficiently far to afford a convenient handle for carrying the container.

While the invention has been described in detail by way of illustration, it is not intended so to limit the invention inasmuch as variations in the details thereof may be made, as will be apparent to one skilled in the art, without departing from the spirit and scope of the invention as defined in the following claims.

What we claim as our invention is as follows:

1. In combination, a plurality of containers each having an outwardly flaring margin affording a laterally offset portion surrounded by an adjoining upstanding portion, said offset portion and upstanding portion constituting a shallow socket, said containers being adapted to be nested together with upper containers resting on the laterally offset portions and fitting within the upstanding portions of next lower sockets, a cover adapted to rest on the laterally offset portion and to fit within the upstanding portion of the uppermost container, a knob fastened to the top of the cover, a one-piece wire clip having inturned portions and an intermediate portion joining the inturned portions, said clip being engageable with the cover and the lowermost container, with the intermediate portion extending over the cover and engaging the knob and with the inturned portions engaging the underside of the outwardly flaring margin of the lowermost container, the clip being out of substantially forceable engagement with any intermediate container, the clip being in sprung condition to maintain the ensemble tightly together, the clip being detachable by springing the inturned portions free from the outwardly flaring margin.

2. In combination, a plurality of containers each having an outwardly flaring margin affording a laterally offset portion surrounded by an adjoining upstanding portion, said offset portion and upstanding portion constituting a shallow socket, said containers being adapted to be nested together with upper containers resting on the laterally offset portions and fitting within the upstanding portions of next lower sockets, a cover adapted to rest on the laterally offset portion and to fit within the upstanding portion of the uppermost container, a knob fastened to the top of the cover, a wire clip having inturned portions and an intermediate portion joining the inturned portions, said clip being engageable with the cover and the lowermost container, with the intermediate portion extending over the cover and engaging the knob and with the inturned portions engaging the underside of the outwardly flaring margin of the lowermost container, the clip being out of substantially forceable engagement with any intermediate container, the clip being in sprung condition to maintain the ensemble tightly together, the clip being detachable by springing the inturned portions free from the outwardly flaring margin.

3. In combination, a plurality of containers each having an outwardly flaring margin affording a laterally offset portion surrounded by an adjoining upstanding portion, said offset portion and upstanding portion constituting a shallow socket, said containers being adapted to be nested together with upper containers resting on the laterally offset portions and fitting within the upstanding portions of next lower sockets, a cover adapted to rest on the laterally offset portion and to fit within the upstanding portion of the uppermost container, a central raised portion on the top of the cover, a one-piece wire clip having inturned portions and an intermediate portion joining the inturned portions, said clip being engageable with the cover and the lowermost container, with the intermediate portion extending over the cover and engaging the central raised portion and with the inturned portions engaging the underside of the outwardly flaring margin of the lowermost container, the clip being out of substantially forceable engagement with any intermediate container, the clip being in sprung condition to maintain the ensemble tightly together, the clip being detachable by springing the inturned portions free from the outwardly flaring margin.

4. In combination, a plurality of receptacles adapted to be stacked together, said receptacles having interfitting portions which include a substantially vertically extending side wall portion on a receptacle and a complementary substantially vertical side wall portion on the juxtaposed receptacle, said side wall portions of juxtaposed stacked receptacles fitting together telescopically, said inter-fitting portions including a part extending laterally relative to the side wall of a receptacle and a complementary part extending laterally relative to the side wall of the juxtaposed receptacle, the laterally extending part of an upper stacked receptacle being supported on the laterally extending part of the juxtaposed lower stacked receptacle, said telescoping side wall portions and inter-engaging laterally extending parts constituting a shallow socket-like fit between stacked receptacles, the lowermost receptacle having a flange extending in lateral outward direction relative to the side wall of the receptacle, covering means adapted to seat on the side wall of the uppermost receptacle, said covering means having a central part located substantially on an axis extending centrally through the inter-fitting portions of the stacked receptacles, a wire clip having inturned portions and an intermediate portion joining the inturned portions, said clip being engageable with the covering means and the lowermost receptacle with the intermediate portion extending over the covering means and engaging said central part and with the inturned portions engaging the underside of said flange at substantially opposite locations relative to said axis, the clip being in sprung condition to maintain the ensemble tightly together, the clip being detachable by springing the inturned portions free from the flange, the clip being free of gripping engagement with any intermediate receptacle.

5. In combination, a plurality of receptacles adapted to be stacked together, said receptacles having interfitting portions which include a substantially vertically extending side wall portion on a receptacle and a complementary substantially vertical side wall portion on the juxtaposed receptacle, said side wall portions of juxtaposed stacked receptacles fitting together telescopically, said inter-fitting portions including a part extending laterally relative to the side wall of a receptacle and a complementary part extending laterally relative to the side wall of the juxtaposed receptacle, the laterally extending part of an upper stacked receptacle being supported on the laterally extending part of the juxtaposed lower stacked receptacle, said telescoping side wall portions and inter-engaging laterally extending parts constituting a shallow socket-like fit between stacked receptacles, the lowermost receptacle having a flange extending in lateral outward direction relative to the side wall of the receptacle, covering means adapted to seat on the side wall of the uppermost receptacle, said covering means having a central part located substantially on an axis extending centrally through the inter-fitting portions of the stacked receptacles, a wire clip having inturned portions and an intermediate portion joining the inturned portions, said clip being engageable with the covering means and the lowermost receptacle with the intermediate portion extending over the covering means and engaging said central part and with the inturned portions engaging the underside of said flange at substantially opposite locations relative to said axis, the clip being in sprung condition to maintain the ensemble tightly together, the clip being detachable by springing the inturned portions free from the flange, the clip being free of engagement in a direction substantially parallel to said axis with any intermediate receptacle.

FREDERICK F. PFEFFERKORN.
CARL A. STEVENS.